(12) United States Patent
Sasaki et al.

(10) Patent No.: US 10,044,299 B2
(45) Date of Patent: Aug. 7, 2018

(54) MOTOR DRIVING DEVICE

(71) Applicant: TOYOTA JIDOSHA KABUSHIKI KAISHA, Toyota-shi (JP)

(72) Inventors: Yu Sasaki, Toyota (JP); Hiroyuki Iyama, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/820,554

(22) Filed: Nov. 22, 2017

(65) Prior Publication Data

US 2018/0152124 A1    May 31, 2018

(30) Foreign Application Priority Data

Nov. 28, 2016    (JP) .................................. 2016-229910

(51) Int. Cl.
  *H02H 7/09*    (2006.01)
  *H02P 6/12*    (2006.01)

(52) U.S. Cl.
  CPC ..................................... *H02P 6/12* (2013.01)

(58) Field of Classification Search
  CPC ........................................................ H02H 7/09
  USPC ................................................... 318/400.22
  See application file for complete search history.

(56) References Cited

U.S. PATENT DOCUMENTS

| 7,176,651 | B2 * | 2/2007 | Kifuku | H02M 1/32 |
| | | | | 318/801 |
| 7,498,761 | B2 * | 3/2009 | Iwashita | H02P 29/032 |
| | | | | 318/609 |
| 2007/0176577 | A1 * | 8/2007 | Kezobo | B62D 5/046 |
| | | | | 318/807 |
| 2010/0033122 | A1 | 2/2010 | Hartman et al. | |

FOREIGN PATENT DOCUMENTS

| EP | 2518894 A2 | 10/2012 |
| JP | 09-182447 | 7/1997 |
| JP | 3269368 B2 | 1/2002 |
| JP | 2013-118777 | 6/2013 |

* cited by examiner

*Primary Examiner* — Erick Glass
(74) *Attorney, Agent, or Firm* — Oblon, McClelland, Maier & Neustadt, L.L.P.

(57) ABSTRACT

A motor driving device includes: an inverter control unit configured to generate and output a control signal for feedback-controlling a motor using a control command value for setting driving of the motor and a feedback value including a current value of driving power supplied to the motor; an inverter configured to supply driving power to the motor in accordance with the control signal output from the inverter control unit; and an abnormality detecting unit configured to detect an abnormality of the inverter. The abnormality detecting unit determines that the inverter is abnormal when a sum of three-phase AC voltage values of the driving power supplied to the motor is greater than a predetermined voltage value and a difference between the control command value supplied to the inverter control unit and the feedback value is less than a predetermined value.

5 Claims, 8 Drawing Sheets

MOTOR DRIVING DEVICE

INCORPORATION BY REFERENCE

The disclosure of Japanese Patent Application No. 2016-229910 filed on Nov. 28, 2016 including the specification, drawings and abstract is incorporated herein by reference in its entirety.

BACKGROUND

1. Technical Field

The disclosure relates to a motor driving device.

2. Description of Related Art

In general, a motor that is driven with a three-phase alternating current is driven using three-phase AC driving power generated by an inverter. A technique of an abnormality detecting circuit that detects an abnormality of an inverter is disclosed in Japanese Unexamined Patent Application Publication No. 9-182447 (JP 9-182447 A). The abnormality detecting circuit disclosed in JP 9-182447 A detects an abnormality of the inverter using a characteristic that a sum of three-phase AC voltage values output from the inverter is theoretically zero. Specifically, when the sum of three-phase AC voltage values output from the inverter is greater than a predetermined value, it is determined that the inverter is abnormal.

SUMMARY

As described above, the abnormality detecting circuit disclosed in JP 9-182447 A determines that the inverter is abnormal when the sum of three-phase AC voltage values output from the inverter is greater than a predetermined value. When an abnormality of the inverter is detected using three-phase AC voltage values in this way, there is an advantage that the configuration of the abnormality detecting circuit can be simplified.

However, when a motor is driven by the inverter, the sum of three-phase AC voltage values varies depending on a driving state of the motor. That is, the sum of three-phase AC voltage values is theoretically constant, but the sum of three-phase AC voltage values varies depending on the driving state of the motor when the motor is driven using the inverter, and thus the inverter may be erroneously detected to be abnormal even when the inverter is not actually abnormal. Accordingly, there is a likelihood that an abnormality of the inverter will not be detected with high accuracy.

The disclosure provides a motor driving device that can detect an abnormality of an inverter with high accuracy.

According to an aspect of the disclosure, there is provided a motor driving device that drives a motor which is driven with a three-phase alternating current, the motor driving device including: an inverter control unit configured to generate and output a control signal for feedback-controlling the motor using a control command value for setting driving of the motor and a feedback value including at least one of a current value of driving power supplied to the motor, a rotational speed of the motor, and a torque value of the motor; an inverter configured to supply the driving power to the motor in accordance with the control signal output from the inverter control unit; and an abnormality detecting unit configured to detect an abnormality of the inverter. The abnormality detecting unit is configured to determine that the inverter is abnormal when a sum of three-phase AC voltage values of the driving power supplied to the motor is greater than a predetermined voltage value and a difference between the control command value supplied to the inverter control unit and the feedback value is less than a predetermined value.

In the motor driving device according to the disclosure, it is determined whether the inverter is abnormal using the difference between the control command value and the feedback value in addition to the sum of the three-phase AC voltage values of the driving power. That is, when the motor is driven using the inverter, there is a characteristic that the sum of the three-phase AC voltages increases at a time at which the difference between the control command value and the feedback value increases (in other words, a time at which a change of a control value of the motor increases). In the disclosure, focusing on that characteristic, it is determined that the inverter is not abnormal when the sum of the three-phase AC voltage values of the driving power is great and the difference between the control command value and the feedback value is great. Accordingly, it is possible to prevent erroneous detection of an abnormality of the inverter and to accurately detect an abnormality of the inverter.

According to the disclosure, it is possible to provide a motor driving device that can detect an abnormality of an inverter with high accuracy.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described with reference to the accompanying drawings. A motor driving device according to the disclosure feedback-controls a motor using a feedback value including at least one of a current value of driving power supplied to the motor, a rotational speed of the motor, and a torque value of the motor when driving the motor.

In a motor driving device 1 (see FIGS. 1 to 4) according to a first embodiment which will be described below, a configuration for feedback-controlling a motor using current values Id and Iq of driving power supplied to the motor will be described. In a motor driving device 2 (see FIGS. 5 and 6) according to a second embodiment which will be described below, a configuration for feedback-controlling a motor using a rotational speed Vel of the motor will be described. In a motor driving device 3 (see FIGS. 7 and 8) according to a third embodiment which will be described below, a configuration for feedback-controlling a motor using a torque value Trq of the motor will be described.

First Embodiment

Figure 1:
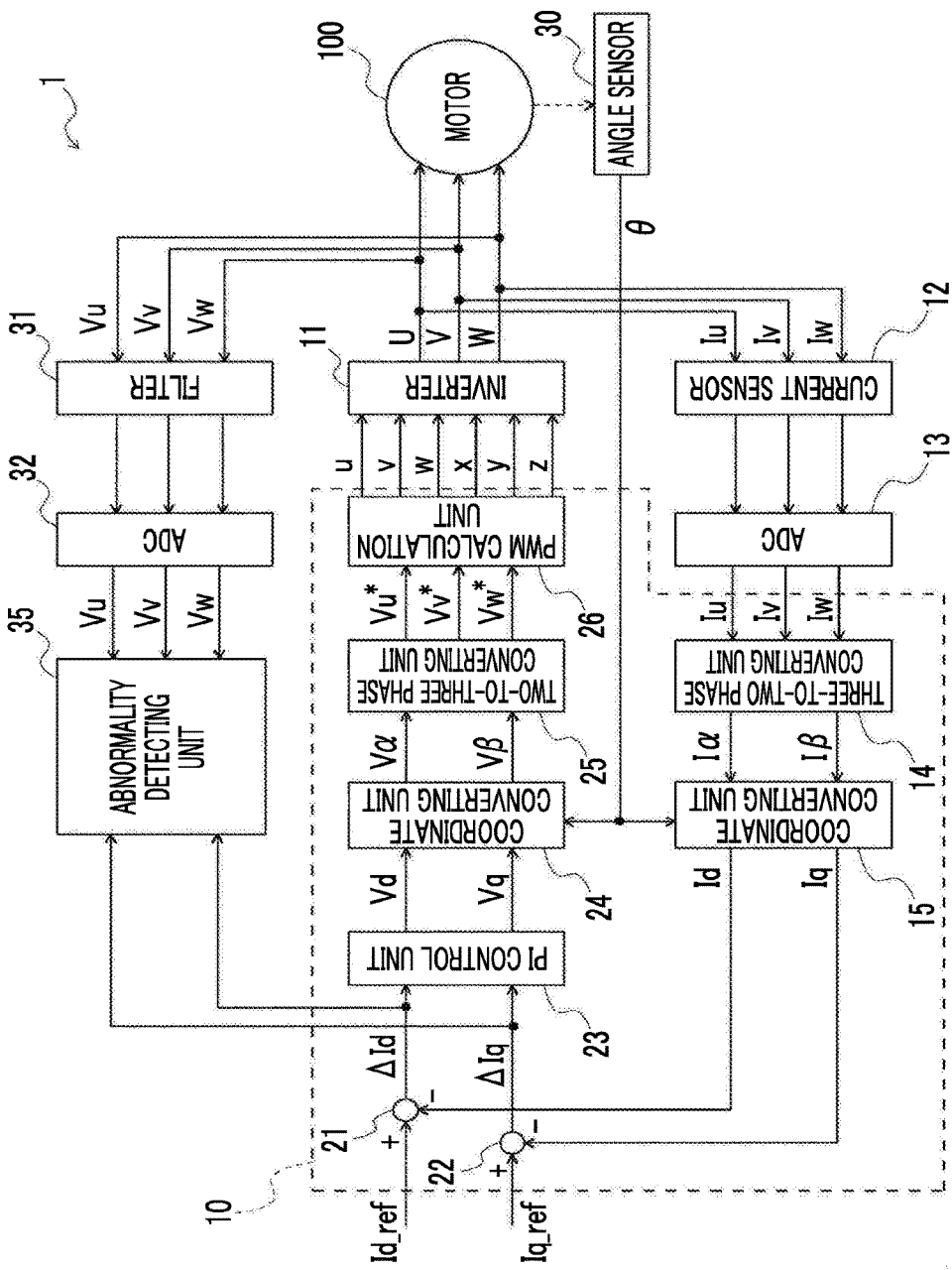
FIG. 1 is a block diagram illustrating a motor driving device according to a first embodiment.

FIG. 1 is a block diagram illustrating a motor driving device 1 according to the first embodiment. The motor driving device 1 according to this embodiment is a device that drives a motor 100 which is driven with three-phase alternating currents (a U phase, a V phase, and a W phase) using vector control.

As illustrated in FIG. 1, the motor driving device 1 includes an inverter 11, a current sensor 12, an AD converter 13, a three-to-two phase converting unit 14, a coordinate converting unit 15, subtractors 21 and 22, a PI control unit 23, a coordinate converting unit 24, a two-to-three phase converting unit 25, a pulse width modulation (PWM) calculation unit 26, an angle sensor 30, a filter 31, an AD converter 32, and an abnormality detecting unit 35.

Here, the three-to-two phase converting unit 14, the coordinate converting unit 15, the subtractors 21 and 22, the PI control unit 23, the coordinate converting unit 24, the two-to-three phase converting unit 25, and the PWM calculation unit 26 constitute an inverter control unit 10. The inverter control unit 10 generates a control signal for feedback-controlling the motor 100 and controls the inverter 11 using the control signal.

The inverter control unit 10 can be constituted, for example, by a microcomputer. In a specific example, the inverter control unit 10 includes at least a processor and a memory, and the processor controls the inverter 11 by reading and executing software (a computer program) stored in the memory.

Figure 2:
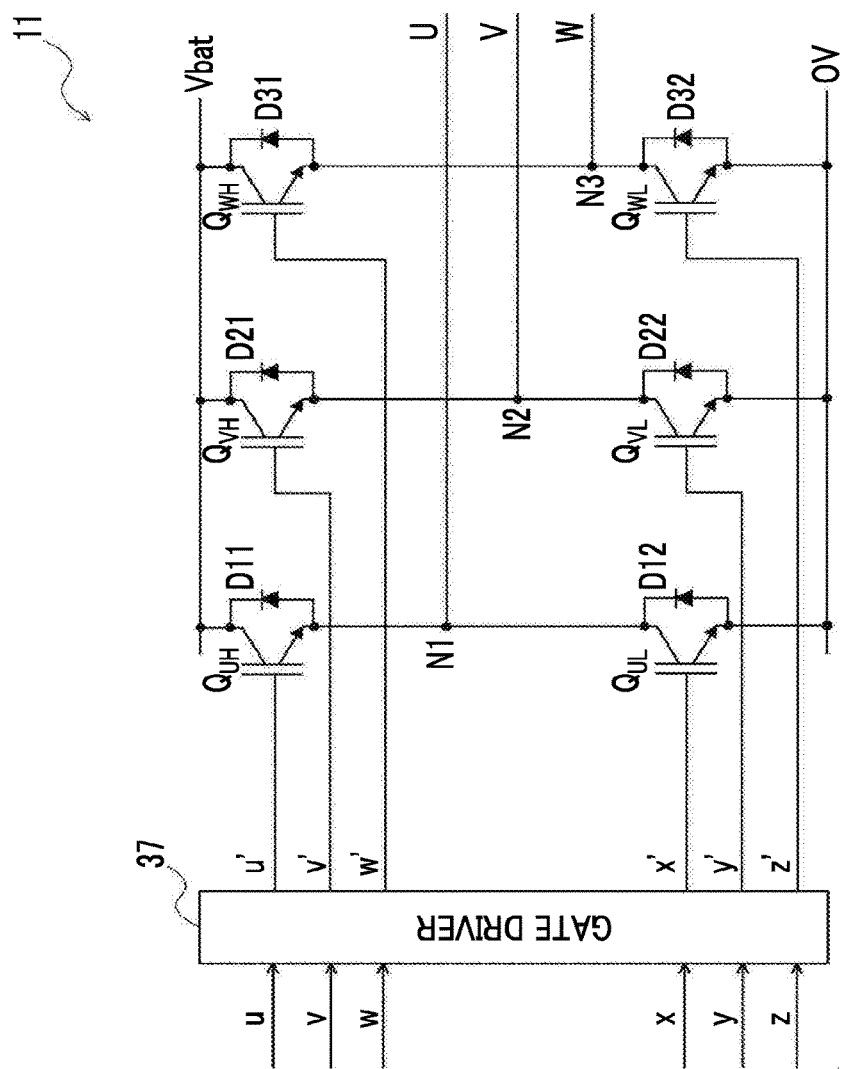
FIG. 2 is a diagram illustrating an example of a configuration of an inverter in the motor driving device according to the first embodiment.

The inverter 11 supplies three-phase AC driving power U, V, and W to the motor 100. FIG. 2 is a diagram illustrating an example of a configuration of the inverter 11. As illustrated in FIG. 2, the inverter 11 includes power transistors $Q_{UH}$, $Q_{UL}$, $Q_{VH}$, $Q_{VL}$, $Q_{WH}$, and $Q_{WL}$, and diodes D11, D12, D21, D22, D31, and D32.

The power transistor $Q_{UH}$ has a configuration in which the collector thereof is connected to a power source Vbat and the emitter thereof is connected to a node N1 and constitutes a U-phase upper arm. The power transistor $Q_{UL}$ has a configuration in which the collector thereof is connected to the node N1 and the emitter thereof is connected to the ground potential (0 V) and constitutes a U-phase lower arm. The power transistor $Q_{VH}$ has a configuration in which the collector thereof is connected to the power source Vbat and the emitter thereof is connected to a node N2 and constitutes a V-phase upper arm. The power transistor $Q_{VL}$ has a configuration in which the collector thereof is connected to the node N2 and the emitter thereof is connected to the ground potential (0 V) and constitutes a V-phase lower arm. The power transistor $Q_{WH}$ has a configuration in which the collector thereof is connected to the power source Vbat and the emitter thereof is connected to a node N3 and constitutes a W-phase upper arm. The power transistor $Q_{WL}$ has a configuration in which the collector thereof is connected to the node N3 and the emitter thereof is connected to the ground potential (0 V) and constitutes a W-phase lower arm.

The diode D11 is connected in antiparallel to the power transistor $Q_{UH}$. The diode D12 is connected in antiparallel to the power transistor $Q_{UL}$. The diode D21 is connected in antiparallel to the power transistor $Q_{VH}$. The diode D22 is connected in antiparallel to the power transistor $Q_{VL}$. The diode D31 is connected in antiparallel to the power transistor $Q_{WH}$. The diode D32 is connected in antiparallel to the power transistor $Q_{WL}$.

The inverter 11 includes a gate driver 37. The gate driver 37 amplifies control signals u, v, w, x, y, and z output from the PWM calculation unit 26 (see FIG. 1) of the inverter control unit 10 to a level at which the power transistors can be driven. The control signals u', v', w', x', y', and z' amplified by the gate driver 37 are supplied to the gates of the power transistors $Q_{UH}$, $Q_{UL}$, $Q_{VH}$, $Q_{VL}$, $Q_{WH}$, and $Q_{WL}$.

Accordingly, the power transistors $Q_{UH}$, $Q_{UL}$, $Q_{VH}$, $Q_{VL}$, $Q_{WH}$, and $Q_{WL}$ are switched in accordance with the control signals u, v, w, x, y, and z generated by the inverter control unit 10, whereby the three-phase AC driving power U, V, and W for driving the motor 100 is supplied from the inverter 11 to the motor 100.

The current sensor 12 illustrated in FIG. 1 detects current values Iu, Iv, and Iw of the driving power U, V, and W supplied to the motor 100. The current values Iu, Iv, and Iw detected by the current sensor 12 are converted into digital signals by the AD converter 13 and are then supplied to the three-to-two phase converting unit 14.

The three-to-two phase converting unit 14 performs Clarke conversion on three-phase AC current values Iu, Iv, and Iw which are converted into digital signals by the AD converter 13 to convert the three-phase AC current values In, Iv, and Iw into two-phase current values Iα and Iβ. Axes of the two current values Iα and Iβ after conversion into two phases are perpendicular to each other. The two-phase current values Iα and Iβ converted by the three-to-two phase converting unit 14 are supplied to the coordinate converting unit 15.

The coordinate converting unit 15 performs Park conversion on the two-phase current values Iα and Iβ supplied from the three-to-two phase converting unit 14 to convert the two-phase current values Iα and Iβ in a fixed coordinate system into two-phase current values Id and Iq in a rotational coordinate system. At this time, the coordinate converting unit 15 acquires information on a rotational angle θ of a rotor of the motor 100 from the angle sensor 30 and converts the coordinates using the rotational angle θ. The current value Id in the rotational coordinate system is a detected current value of a magnetization current and the current value Iq in the rotational coordinate system is a detected current value of a torque current. The two-phase current values Id and Iq after the coordinate conversion are supplied to the subtractors 21 and 22, respectively.

The subtractor 21 calculates a difference ΔId (=Id_ref−Id) between a control command value Id_ref and the current value Id supplied from the coordinate converting unit 15 and supplies the difference ΔId to the PI control unit 23 and the abnormality detecting unit 35. The subtractor 22 calculates a difference ΔIq (=Iq_ref−Iq) between a control command value Iq_ref and the current value Iq supplied from the coordinate converting unit 15 and supplies the difference ΔIq to the PI control unit 23 and the abnormality detecting unit 35.

The PI control unit 23 generates control voltage values Vd and Vq such that the differences ΔId and ΔIq supplied from the subtractors 21 and 22 is zero and supplies the generated control voltage values Vd and Vq to the coordinate converting unit 24. At this time, the PI control unit 23 generates the control voltage values Vd and Vq using P control (proportional control) and I control (integral control).

The coordinate converting unit 24 performs inverse Park conversion on the control voltage values Vd and Vq supplied from the PI control unit 23 to convert the control voltage values Vd and Vq in the rotational coordinate system into control voltage values Vα and Vβ in the fixed coordinate system. At this time, the coordinate converting unit 24 acquires information on the rotational angle θ of the rotor of the motor 100 from the angle sensor 30 and converts coordinates using the rotational angle θ. The control voltage values Vα and Vβ after the coordinate conversion to the two-to-three phase converting unit 25.

The two-to-three phase converting unit 25 performs inverse Clarke conversion on the two-phase control voltage values Vα and Vβ supplied from the coordinate converting unit 24 to convert the two-phase control voltage values Vα and Vβ into three-phase control voltage values Vu*, Vv*, and Vw*. Here, the three-phase control voltage values Vu*, Vv*, and Vw* are values corresponding to driving power U, V, and W supplied to the motor 100. The three-phase control voltage values Vu*, Vv*, and Vw* have the same amplitude and have phases 120° different from each other. The three-phase control voltage values Vu*, Vv*, and Vw* converted by the two-to-three phase converting unit 25 are supplied to the PWM calculation unit 26.

The PWM calculation unit 26 generates pulse-shaped control signals u, v, w, x, y, and z for controlling the inverter 11 based on the three-phase control voltage values Vu*, Vv*, and Vw* supplied from the two-to-three phase converting unit 25. The inverter 11 generates driving power U, V, and W based on the control signals u, v, w, x, y, and z supplied from the PWM calculation unit 26 and supplies the generated driving power to the motor 100.

That is, the control signals u, v, w, x, y, and z generated by the PWM calculation unit 26 are amplified up to levels at which the power transistors can be driven by the gate driver 37 illustrated in FIG. 2. The control signals u', v', w', x', y', and z' amplified by the gate driver 37 are supplied to the gates of the power transistors $Q_{UH}$, $Q_{VH}$, $Q_{WH}$, $Q_{UL}$, $Q_{VL}$, and $Q_{WL}$, respectively. Accordingly, the power transistors $Q_{UH}$, $Q_{VH}$, $Q_{WH}$, $Q_{UL}$, $Q_{VL}$, and $Q_{WL}$ are switched and three-phase AC driving power U, V, and W for driving the motor 100 is supplied from the inverter 11 to the motor 100.

In this way, the motor driving device 1 according to this embodiment feedback-controls the motor 100 using current values Iu, Iv, and Iw of the driving power U, V, and W supplied to the motor 100 as feedback values.

The motor driving device 1 according to this embodiment detects an abnormality of the inverter 11 using the abnormality detecting unit 35. The abnormality detecting unit 35 is supplied with information on the voltage values Vu, Vv, and Vw of the driving power U, V, and W supplied to the motor 100. The voltage values Vu, Vv, and Vw of the driving power U, V, and W are subjected to removal of noise in the filter 31, are converted into digital signals by the AD converter 32, and then are supplied to the abnormality detecting unit 35.

The abnormality detecting unit 35 is supplied with the difference ΔId between the control command value Id_ref and the current value Id from the subtractor 21 and the difference ΔIq between the control command value Iq_ref and the current value Iq from the subtractor 22.

In the motor driving device 1 according to this embodiment, the abnormality detecting unit 35 determines that the inverter 11 is abnormal when a sum of the voltage values Vu, Vv, and Vw of the driving power U, V, and W supplied to the motor 100 is equal to or greater than a predetermined voltage value and the differences ΔId and ΔIq between the control command values Id_ref and Iq_ref supplied to the inverter control unit 10 and the feedback values Id and Iq are less than a predetermined value. The abnormality detecting unit 35 determines that the inverter 11 malfunctions when an abnormality of the inverter 11 is detected a predetermined number of times. An abnormality detecting operation of the motor driving device 1 according to this embodiment will be described below in detail.

Figure 3:
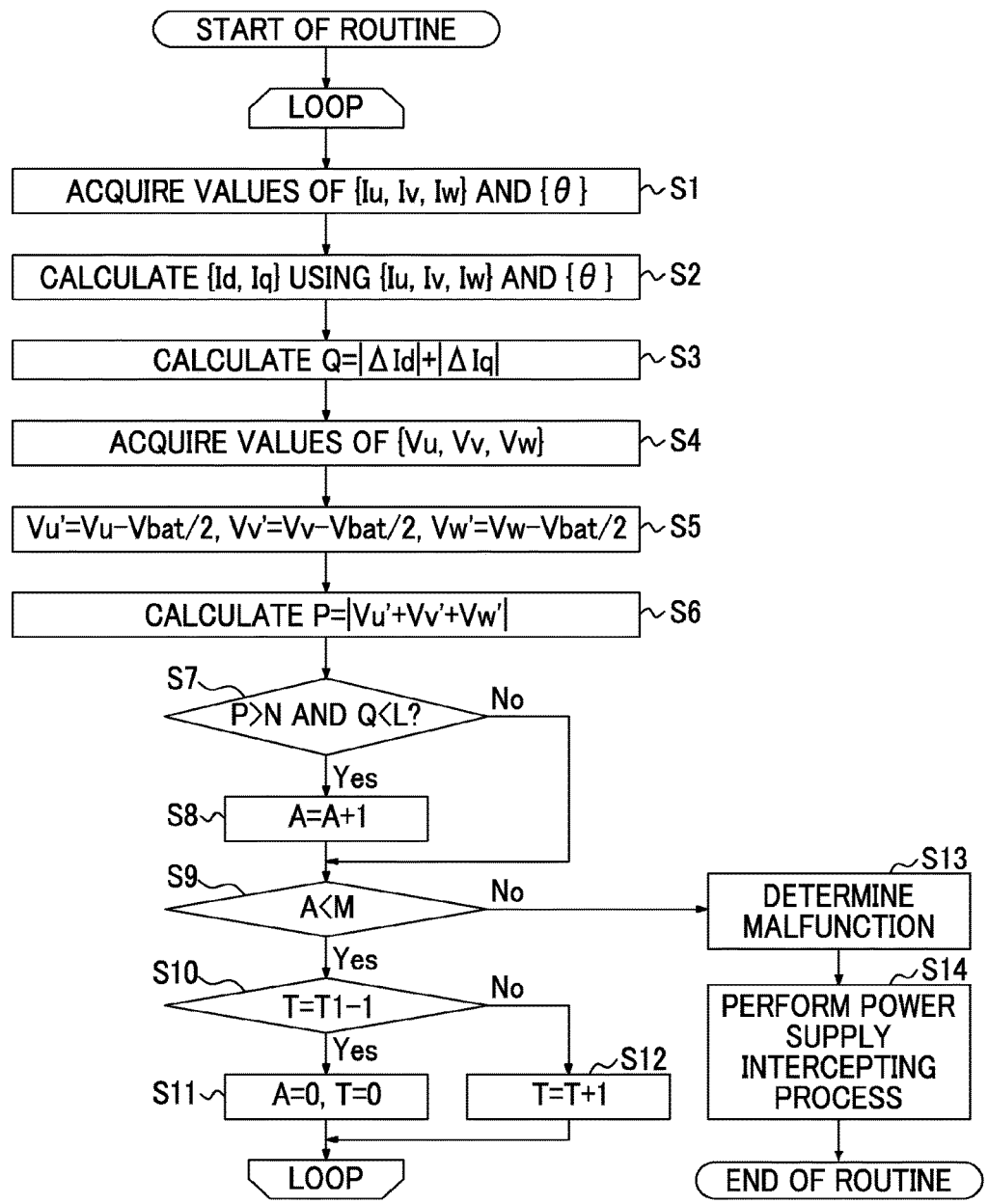
FIG. 3 is a flowchart illustrating an abnormality detecting operation of the motor driving device according to the first embodiment.

FIG. 3 is a flowchart illustrating the abnormality detecting operation of the motor driving device 1 according to this embodiment. An operation of the abnormality detecting unit 35 detecting that the inverter 11 is abnormal when the motor driving device 1 feedback-controls the motor 100 will be described below.

First, the inverter control unit 10 illustrated in FIG. 1 acquires current values Iu, Iv, and Iw of the driving power U, V, and W output from the inverter 11 and a rotational angle θ of the rotor of the motor 100 (Step S1). Specifically, the three-to-two phase converting unit 14 of the inverter control unit 10 acquires current values Iu, Iv, and Iw converted into digital signals by the AD converter 13. The coordinate converting unit 15 acquires the rotational angle θ of the rotor of the motor 100 from the angle sensor 30.

Then, the inverter control unit 10 calculates two-phase current values Id and Iq which are feedback values using the current values Iu, Iv, and Iw and the rotational angle θ of the rotor of the motor 100 (Step S2). Specifically, the three-to-two phase converting unit 14 of the inverter control unit 10 performs Clarke conversion on three-phase AC current values Iu, Iv, and Iw which are converted into digital signals by the AD converter 13 to convert the three-phase AC current values Iu, Iv, and Iw into two-phase current values Iα and Iβ. Thereafter, the coordinate converting unit 15 performs Park conversion on the two-phase current values Iα and Iβ supplied from the three-to-two phase converting unit 14 to convert the two-phase current values Iα and Iβ in a fixed coordinate system into two-phase current values Id and Iq in a rotational coordinate system. At this time, the coordinate converting unit 15 converts the coordinates using the rotational angle θ acquired from the angle sensor 30.

Then, the abnormality detecting unit 35 acquires a difference ΔId (=Id_ref−Id) between the control command value Id_ref and the current value Id which is calculated by the subtractor 21 and a difference ΔIq (=Iq_ref−Iq) between the control command value Iq_ref and the current value Iq which is calculated by the subtractor 22. Then, the abnormality detecting unit 35 calculates Q=|ΔId|+|ΔIq| using the difference ΔId and the difference ΔIq (Step S3). Here, the value of Q is a parameter corresponding to the difference between the control command value and the feedback value and means that the larger the value of Q becomes, the larger the difference between the control command value and the feedback value becomes. Hereinafter, the value of Q is also referred to as a "control difference Q."

Another expression may be used to calculate the value of Q. For example, a sum of squares of the differences ΔId and ΔIq may be used. In this case, $Q=\Delta Id^2+\Delta Iq^2$ is acquired. The differences ΔId and ΔIq may be weighted. In this case, Q=K×|ΔId|+P×|ΔIq| (where K and P are arbitrary constants for weighting) is acquired. The value of Q may be calculated using another expression.

Then, the abnormality detecting unit 35 acquires the voltage values Vu, Vv, and Vw of the driving power U, V, and W output from the inverter 11 (Step S4). Specifically, the voltage values Vu, Vv, and Vw of the driving power U, V, and W output from the inverter 11 are subjected to removal of noise in the filter 31, are converted into digital signals by the AD converter 32, and then are supplied to the abnormality detecting unit 35. For example, the filter 31 can be constituted by a low-pass filter. The filter 31 may be constituted by hardware or may be constituted by software.

Then, the abnormality detecting unit 35 calculates voltage values Vu', Vv', and Vw' using Expressions 1 to 3 (Step S5).

$$Vu'=Vu-Vbat/2 \quad \text{(Expression 1)}$$

$$Vv'=Vv-Vbat/2 \quad \text{(Expression 2)}$$

$$Vw'=Vw-Vbat/2 \quad \text{(Expression 3)}$$

Here, Vbat denotes a source voltage which is supplied to the inverter 11 (see FIG. 2).

Then, the abnormality detecting unit 35 calculates P=|Vu'+Vv'+Vw'| (Step S6). The value of P corresponds to a sum of the voltage values of the driving power U, V, and W and is theoretically a constant value. Hereinafter, the value of P is also referred to as a "sum of three-phase voltage values P."

In this embodiment, as illustrated in FIG. 2, the power transistors constituting the inverter 11 are connected between the source voltage Vbat and the ground potential 0 V. Accordingly, the voltage values Vu, Vv, and Vw of the driving power U, V, and W supplied to the motor 100 are displaced between the source voltage Vbat and 0 V. That is, the voltage values Vu, Vv, and Vw have waveforms (of which phases are different 120° from each other) centered on Vbat/2. Accordingly, the sum of Vu, Vv, and Vw is as follows.

$$Vu+Vv+Vw=3Vbat/2 \quad \text{(Expression 4)}$$

On the other hand, as described in Step S6, the sum of Vu', Vv', and Vw' can be expressed as follows using Expressions 1 to 3.

$$P=|Vu'+Vv'+Vw'|=|(Vu-Vbat/2)+(Vv-Vbat/2)+(Vw-Vbat/2)|=|Vu+Vv+Vw-3Vbat/2| \quad \text{(Expression 5)}$$

Here, the following expression is obtained by substituting Expression 4 for Expression 5.

$$P=|Vu'+Vv'+Vw'|=0 \quad \text{(Expression 6)}$$

That is, the sum of three-phase voltage values P is theoretically zero as expressed by Expression 6.

Then, the abnormality detecting unit 35 determines whether the inverter is abnormal using the sum of three-phase voltage values P and the control difference Q which have been calculated as described above. First, the abnormality detecting unit 35 determines whether the sum of three-phase voltage values P is greater than a predetermined voltage value N (P>N) and whether the control difference Q is less than a predetermined value L (Q<L) (Step S7). Here, the voltage value N and the value L can be arbitrarily determined.

Since the sum of three-phase voltage values P is theoretically zero as described above, there is a likelihood that the inverter 11 will be abnormal when the sum of three-phase voltage values P is greater than the predetermined voltage value N (P>N). However, the sum of three-phase voltage values P has a increasing tendency even when the control difference Q is large. Accordingly, when the sum of three-phase voltage values P is greater than the predetermined voltage value N (P>N) and the control difference Q is equal to or greater than the predetermined value L (Q≥L) (NO in Step S7), it is determined that the inverter 11 is not abnormal, and the routine transitions to Step S9.

On the other hand, when the sum of three-phase voltage values P is greater than the predetermined voltage value N (P>N) and the control difference Q is less than the predetermined value L (Q<L) (YES in Step S7), it is determined that the inverter 11 is abnormal. In this case, the routine transitions to Step S8 and an abnormality detection count value A is increased by 1 (Step S8). The abnormality detection count value A increases whenever it is determined that the inverter 11 is abnormal (that is, whenever the determination result of Step S7 is YES) at the time of repeating the routine of the flowchart illustrated in FIG. 3.

Thereafter, in Step S9, it is determined whether the abnormality detection count value A is less than an upper limit value M of the abnormality detection count value A. That is, at the time of repeating the routine of the flowchart illustrated in FIG. 3, a likelihood that the inverter 11 malfunctions increases as the abnormality detection count value A increases. Accordingly, the abnormality detecting unit 35 sets the upper limit value M of the abnormality detection count value A and determines that the inverter 11 malfunctions (Step S13) when the abnormality detection count value A is equal to or greater than the upper limit value M (NO in Step S9).

That is, when it is determined in Step S7 that the inverter 11 is abnormal, the inverter 11 may not actually malfunction. In this embodiment, by setting the upper limit value M of the abnormality detection count value A, it is possible to accurately determine whether the inverter 11 malfunctions. The upper limit value M is an integer equal to or greater than 1 and can be arbitrarily determined. When it is determined that the inverter 11 malfunctions, a process of intercepting the power supply of the motor driving device 1 (Step S14).

On the other hand, when the abnormality detection count value A is less than the upper limit value M of the abnormality detection count value A (YES in Step S9), the routine transitions to Step S10 without determining whether the inverter 11 malfunctions. In Step S10, T1 denotes an abnormality detection time and T denotes a count value. That is, the abnormality detection time T1 is a set value of the number of times in which the loop of the flowchart illustrated in FIG. 3 is repeated. The count value T is the number of times in which the loop of the flowchart illustrated in FIG. 3 is repeated.

For example, when the routine of the flowchart illustrated in FIG. 3 is performed at the first time, the count value T is zero and thus the condition of T=T1−1 is not satisfied (NO in Step S10). In this case, in Step S12, the count value T is increased by 1. On the other hand, when the routine of the flowchart illustrated in FIG. 3 is performed at the T1-th time, the count value T is equal to T1−1 and thus the condition of T=T1−1 is satisfied (YES in Step S10). In this case, in Step S11, the count value T is reset to zero. The abnormality detection count value A is also reset to zero.

In the motor driving device 1 according to this embodiment, an abnormality of the inverter 11 can be detected by repeatedly performing the routine of the flowchart illustrated in FIG. 3. For example, the abnormality detecting unit 35 may monitor the sum of three-phase voltage values P and the control difference Q and may count up the count value T with first satisfaction of the condition that "the sum of three-phase voltage values P is greater than the predetermined voltage value N (P>N) and the control difference Q is less than the predetermined value (Q<L)" as a trigger (that is, the loop of the flowchart illustrated in FIG. 3 may be repeatedly performed).

For example, when a loop period of the routine of the flowchart illustrated in FIG. 3 is set to 4 ms, T1=25 (=100 ms/4 ms) is set to set the abnormality detection time to 100 ms. For example, when the upper limit value of the abnormality detection count value A is set to M=20 and an abnormality is detected 20 or more times among 25 times in which the loop is performed, the abnormality detecting unit 35 determines that the inverter malfunctions (see Steps S9 and S13).

In this way, in the motor driving device 1 according to this embodiment, it is determined whether the inverter 11 is abnormal using the differences ΔId and ΔIq between the control command values and the feedback values in addition to the sum P of the three-phase AC voltage values Vu, Vv, and Vw of the driving power U, V, and W. That is, when the motor 100 is driven using the inverter 11, the sum of three-phase AC voltage values P (=|Vu'+Vv'+Vw'|) increases at a time at which the differences ΔId and ΔIq between the control command values Id_ref and Iq_ref and the feedback values Id and Iq increase (in other words, a change of a control value of the motor increases).

In this embodiment, focusing on that characteristic, it is determined that the inverter 11 is not abnormal when the sum of the three-phase AC voltage values P of the driving power is large and the differences ΔId and ΔIq between the control command values Id_ref and Iq_ref and the feedback values Id and Iq is large. Accordingly, it is possible to prevent erroneous detection of an abnormality of the inverter and to accurately detect an abnormality of the inverter.

An example in which Q=|ΔId|+|ΔIq| (that is, the sum of the difference ΔId and the difference ΔIq) is used as the control difference Q has been described above. However, in this embodiment, one of the difference ΔId and the difference ΔIq may be used as the control difference Q. That is, as the control difference Q, Q=|ΔId| may be used or the Q=|ΔIq| may be used. In this embodiment, the control difference Q may employ any value as long as it is a value indicating a change of a control value of the motor.

Figure 4:
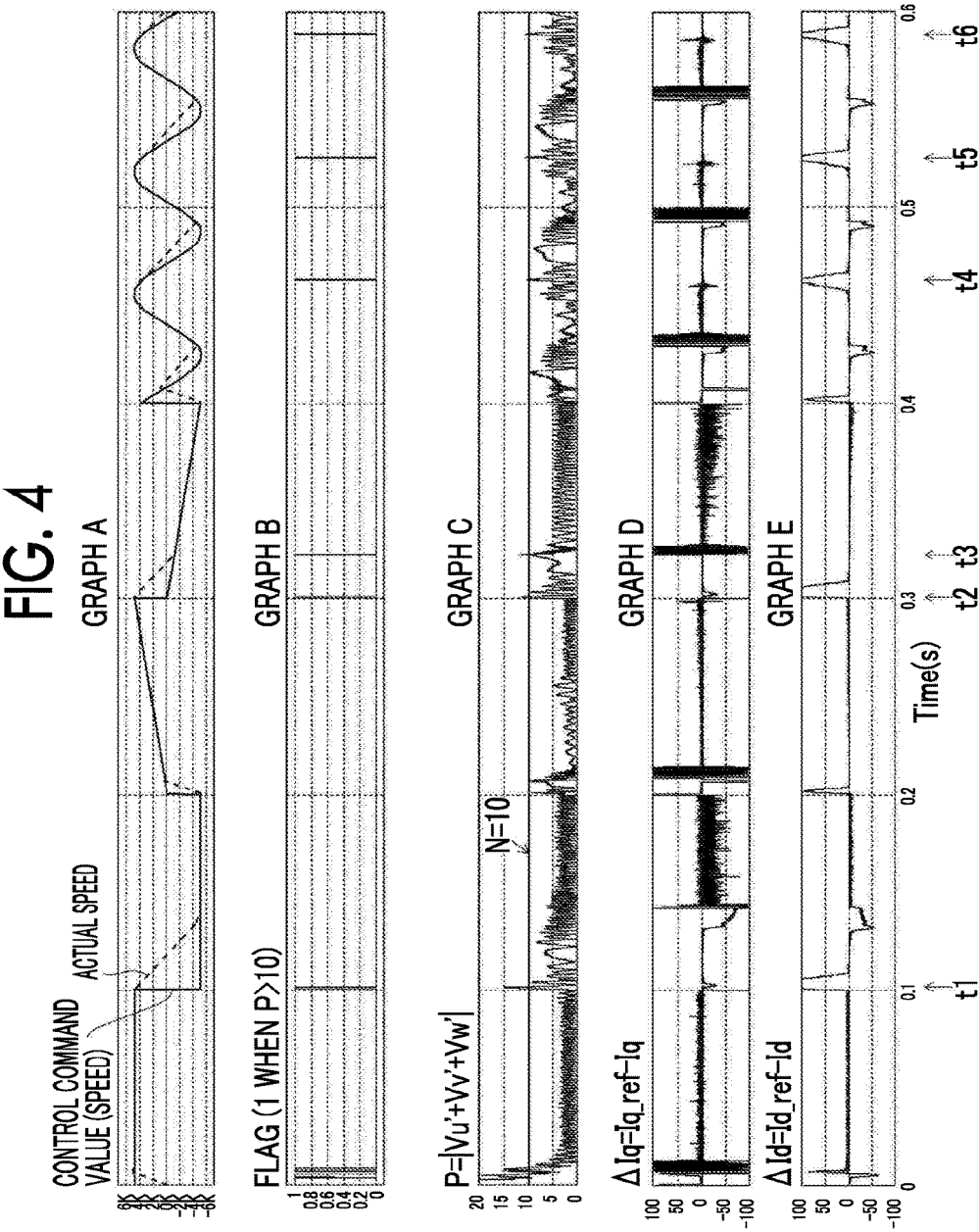
FIG. 4 is a graph illustrating a simulation result of the motor driving device according to the first embodiment.

FIG. 4 is a graph illustrating simulation results of the motor driving device according to this embodiment. In FIG. 4, Graph A indicating a relationship between the control command value and an actual speed, Graph B indicating a time at which a flag is set to "1," Graph C indicating the sum of three-phase voltages P=|Vu'+Vv'+Vw'|, Graph D indicating the difference ΔIq (=Iq_ref−Iq) between the control command value Iq_ref and the current value Iq, and Graph E indicating the difference ΔId (=Id_ref−Id) between the control command value Id_ref and the current value Id are illustrated.

As illustrated in Graph A of FIG. 4, when the control command value changes, the sum of three-phase voltages P illustrated in Graph C has an increasing tendency. In the simulation results illustrated in FIG. 4, the predetermined voltage value N is set to N=10 as illustrated in Graph C. Accordingly, at times t1 to t6 at which the sum of three-phase voltages P is greater than the voltage value N=10 in Graph C, the flag illustrated in Graph B is set to "1." In this way, the sum of three-phase voltages P increases when the control command value changes. Accordingly, when an abnormality of the inverter is detected using only the sum of three-phase voltages P, it may be erroneously detected that the inverter is abnormal even if the inverter is not actually abnormal.

On the other hand, as illustrated in Graphs D and E of FIG. 4, the differences ΔId and ΔIq between the control command values and the feedback values have an increasing tendency at the times at which the control command values change. That is, the sum of three-phase voltages P increases as illustrated in Graphs B and C when the control command values change (see times t1 to t6), but the differences ΔId and ΔIq between the control command values and the feedback values (see Graphs D and E) also increase simultaneously at times t1 to t6. In this embodiment, focusing on that characteristic, it is determined that the inverter 11 is not abnormal when the sum of the three-phase AC voltage values P of the driving power is large and the differences ΔId and ΔIq between the control command values and the feedback values is large. Accordingly, it is possible to prevent erroneous detection of an abnormality of the inverter and to accurately detect an abnormality of the inverter.

Particularly, in the motor driving device 1 according to this embodiment, the three-phase AC current values Iu, Iv, and Iw are detected using the current sensor 12. In an industrial robot or the like, the configuration in which a current sensor is mounted on the inverter is a basic configuration in performing current control. Accordingly, there is an advantage that the motor driving device according to this embodiment can be configured without mounting a particular sensor to the outside.

According to the above-mentioned embodiment, it is possible to provide a motor driving device that can detect an abnormality of an inverter with high accuracy.

Second Embodiment

Figure 5:
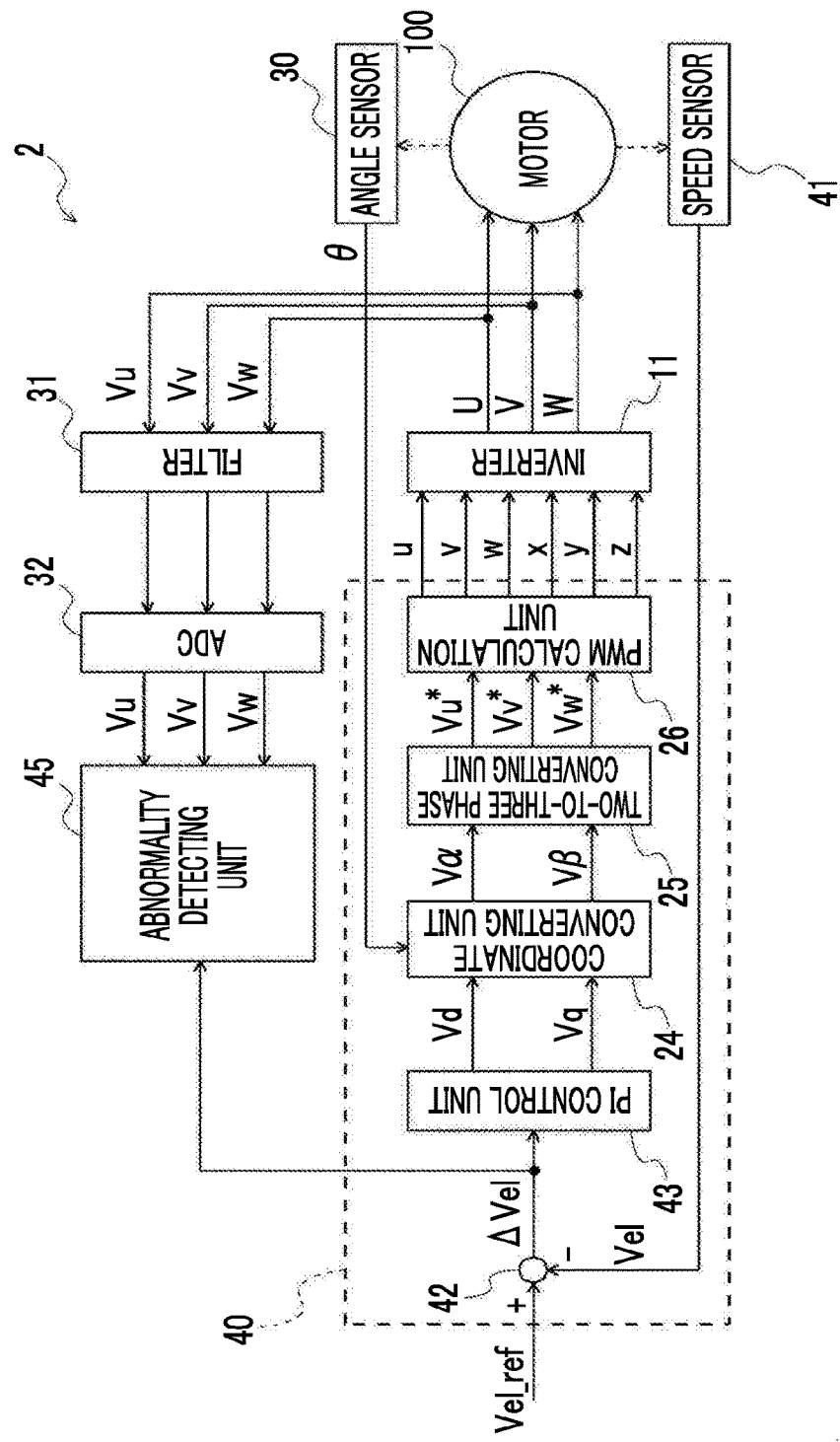
FIG. 5 is a block diagram illustrating a motor driving device according to a second embodiment.

A second embodiment of the disclosure will be described below. FIG. 5 is a block diagram illustrating a motor driving device according to the second embodiment. The motor driving device 2 according to this embodiment is different from the motor driving device 1 according to the first embodiment, in that a rotational speed Vel of the motor is detected using a speed sensor 41 and the motor 100 is feedback-controlled using the detected rotational speed Vel of the motor. The other configurations are the same as the motor driving device 1 described in the first embodiment (see FIGS. 1 to 4) and thus the same elements will be referenced by the same reference signs and description thereof will not be appropriately omitted.

As illustrated in FIG. 5, the motor driving device 2 according to this embodiment includes an inverter 11, a speed sensor 41, a subtractor 42, a PI control unit 43, a coordinate converting unit 24, a two-to-three phase converting unit 25, a PWM calculation unit 26, an angle sensor 30, a filter 31, an AD converter 32, and an abnormality detecting unit 45.

Here, the subtractor 42, the PI control unit 43, the coordinate converting unit 24, the two-to-three phase converting unit 25, and the PWM calculation unit 26 constitute an inverter control unit 40. The inverter control unit 40 generates control signals u, v, w, x, y, and z for feedback-controlling the motor 100 using a difference ΔVel between a rotational speed Vel of the motor 100 detected by the speed sensor 41 and a control command value Vel_ref of the rotational speed Vel of the motor 100.

The speed sensor 41 detects the rotational speed Vel of the motor 100. The rotational speed Vel of the motor 100 detected by the speed sensor 41 is supplied to the subtractor 42. The subtractor 42 calculates the difference ΔVel (=Vel_ref−Vel) between the control command value Vel_ref of the rotational speed Vel of the motor 100 and the rotational speed Vel supplied from the speed sensor 41 and supplies the difference ΔVel to the PI control unit 43 and the abnormality detecting unit 45.

The PI control unit 43 generates control voltage values Vd and Vq such that the difference \Ve1 supplied from the subtractor 42 is zero, and supplies the generated control voltage values Vd and Vq to the coordinate converting unit 24. At this time, the PI control unit 43 generates the control voltage values Vd and Vq using P control (proportional control) and I control (integral control).

The coordinate converting unit 24 performs inverse Park conversion on the control voltage values Vd and Vq supplied from the PI control unit 23 to convert the control voltage values Vd and Vq in the rotational coordinate system into control voltage values Vα and Vβ in the fixed coordinate system. The two-to-three phase converting unit 25 performs inverse Clarke conversion on the two-phase control voltage values Vα and Vβ supplied from the coordinate converting unit 24 to convert the two-phase control voltage values Vα and Vβ into three-phase control voltage values Vu*, Vv*, and Vw*. The PWM calculation unit 26 generates pulse-shaped control signals u, v, w, x, y, and z for controlling the inverter 11 based on the three-phase control voltage values Vu*, Vv*, and Vw* supplied from the two-to-three phase converting unit 25. The inverter 11 generates driving power U, V, and W based on the control signals u, v, w, x, y, and z supplied from the PWM calculation unit 26 and supplies the generated driving power to the motor 100.

In this way, the motor driving device 2 according to this embodiment feedback-controls the motor 100 using the rotational speed Ve1 of the motor 100 detected by the speed sensor 41 as a feedback value. The configurations and operations of the inverter 11, the coordinate converting unit 24, the two-to-three phase converting unit 25, and the PWM calculation unit 26 illustrated in FIG. 5 are the same as described in the first embodiment and thus detailed description thereof will not be repeated.

The motor driving device 2 according to this embodiment detects an abnormality of the inverter 11 using the abnormality detecting unit 45. The abnormality detecting unit 45 is supplied with information on the voltage values Vu, Vv, and Vw of the driving power U, V, and W supplied to the motor 100. The voltage values Vu, Vv, and Vw of the driving power U, V, and W are subjected to removal of noise in the filter 31, are converted into digital signals by the AD converter 32, and then are supplied to the abnormality detecting unit 45. The abnormality detecting unit 45 is supplied with the difference ΔVe1 between the control command value Ve1_ref and the rotational speed Ve1 from the subtractor 42.

In the motor driving device according to this embodiment, the abnormality detecting unit 45 determines that the inverter 11 is abnormal when a sum of the voltage values Vu, Vv, and Vw of the driving power U, V, and W supplied to the motor 100 is equal to or greater than a predetermined voltage value and the difference ΔVe1 between the control command value Ve1_ref supplied to the inverter control unit 40 and the rotational speed Ve1 which is the feedback value is less than a predetermined value. The abnormality detecting unit 45 determines that the inverter 11 malfunctions when an abnormality of the inverter 11 is detected a predetermined number of times. An abnormality detecting operation of the motor driving device 1 according to this embodiment will be described below in detail.

Figure 6:
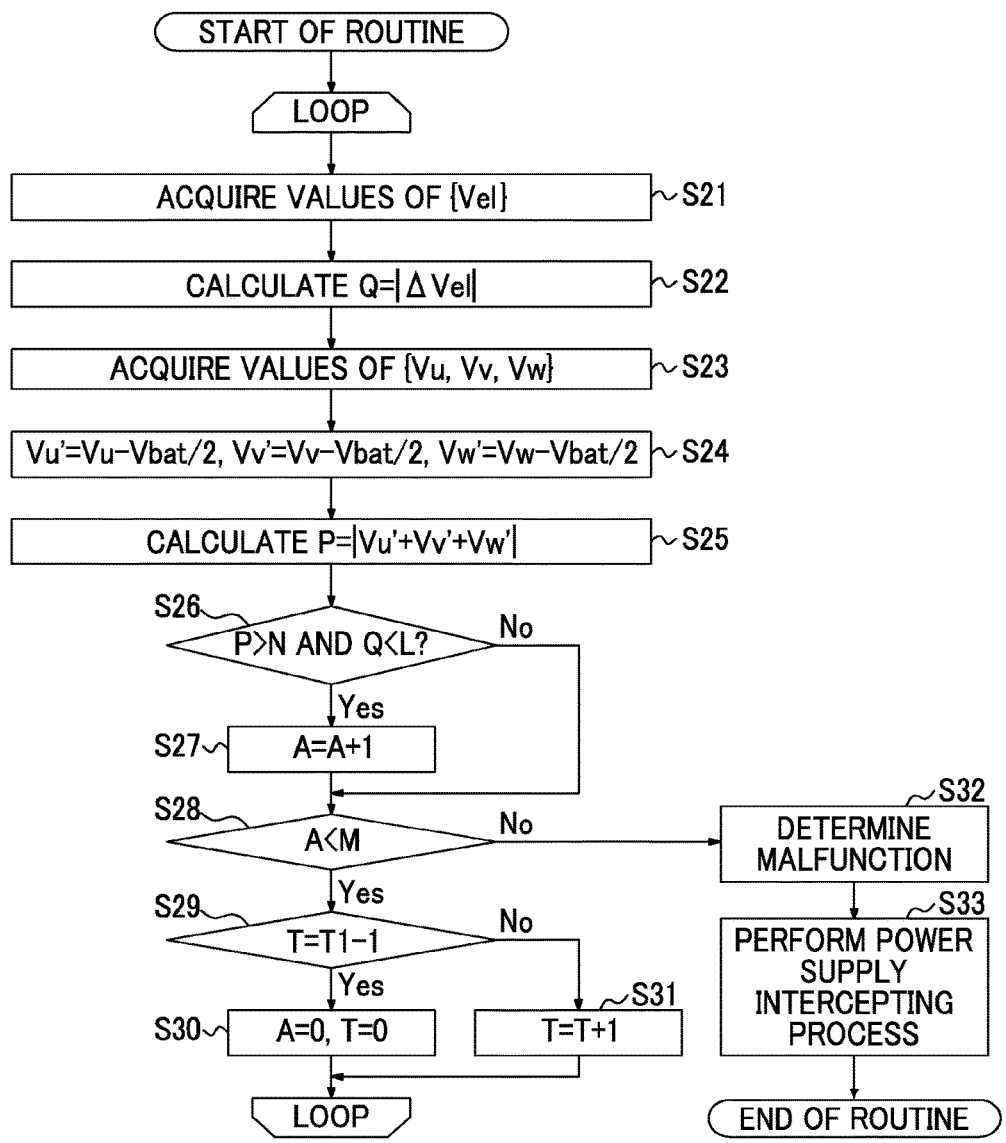
FIG. 6 is a flowchart illustrating an abnormality detecting operation of the motor driving device according to the second embodiment.

FIG. 6 is a flowchart illustrating the abnormality detecting operation of the motor driving device 2 according to this embodiment. An operation of the abnormality detecting unit 45 detecting that the inverter 11 is abnormal when the motor driving device 2 feedback-controls the motor 100 will be described below.

First, the subtractor 42 of the inverter control unit 40 illustrated in FIG. 5 acquires the rotational speed Ve1 of the motor from the speed sensor 41 (Step S21). Then, the subtractor 42 calculates a difference ΔVe1 (=Ve1_ref−Ve1) between the control command value Ve1_ref of the rotational speed Ve1 of the motor 100 and the acquired rotational speed Ve1 and supplies the calculated difference ΔVe1 to the abnormality detecting unit 45.

The abnormality detecting unit 45 calculates Q=|ΔVe1| using the difference ΔVe1 acquired from the subtractor 42 (Step S22). Here, the value of Q is a parameter corresponding to the difference between the control command value and the feedback value and means that the larger the value of Q becomes, the larger the difference between the control command value and the feedback value becomes.

Then, the abnormality detecting unit 45 acquires the voltage values Vu, Vv, and Vw of the driving power U, V, and W output from the inverter 11 (Step S23). Specifically, the voltage values Vu, Vv, and Vw of the driving power U, V, and W output from the inverter 11 are subjected to removal of noise in the filter 31, are converted into digital signals by the AD converter 32, and then are supplied to the abnormality detecting unit 45. For example, the filter 31 can be constituted by a low-pass filter. The filter 31 may be constituted by hardware or may be constituted by software.

Then, the abnormality detecting unit 45 calculates voltage values Vu', Vv', and Vw' using Expressions 1 to 3 which have been described above in the first embodiment (Step S24). Thereafter, the abnormality detecting unit 45 calculates P=|Vu'+Vv'+Vw'| (Step S25). The value of P corresponds to a sum of the voltage values of the driving power U, V, and W and is theoretically a constant value. Steps S24 and S25 illustrated in FIG. 6 are the same as Steps S5 and S6 in FIG. 3.

Then, the abnormality detecting unit 45 determines whether the inverter 11 is abnormal using the sum of three-phase voltage values P and the control difference Q which have been calculated as described above (Steps S26 to S33). The operations of Steps S26 to S33 illustrated in FIG. 6 are the same as the operations of Steps S7 to S14 in FIG. 3 which have been described above in the first embodiment and thus description thereof will not be repeated.

In this way, in the motor driving device 2 according to this embodiment, it is determined whether the inverter 11 is abnormal using the difference ΔVe1 between the control command value and the feedback value in addition to the sum P of the three-phase AC voltage values Vu, Vv, and Vw of the driving power U, V, and W. That is, when the motor 100 is driven using the inverter 11, the sum of three-phase AC voltage values P (=|Vu'+Vv'+Vw'|) increases at a time at which the difference ΔVe1 between the control command value Ve1_ref and the feedback value Ve1 increases (in other words, a change of a control value of the motor increases).

In this embodiment, focusing on that characteristic, it is determined that the inverter 11 is not abnormal when the sum of the three-phase AC voltage values P of the driving power is large and the difference ΔVe1 between the control command value Ve1_ref and the feedback value Ve1 is large. Accordingly, it is possible to prevent erroneous detection of an abnormality of the inverter and to accurately detect an abnormality of the inverter.

As described above, in the motor driving device 2 according to this embodiment, the motor is feedback-controlled using the rotational speed detected by the speed sensor 41. For example, a system of a robot often employs a configuration in which a speed sensor is disposed in a motor. Accordingly, in this embodiment, even when a current sensor is not particularly provided unlike the motor driving device 1 according to the first embodiment, there is an advantage that the motor driving device according to this embodiment can be configured using an existing robot system.

In a robot requiring automatic position estimation such as a mobile robot, speed control is essential, but, for example, when a current sensor is provided like the motor driving device 1 according to the first embodiment, a response may be delayed. Accordingly, when the motor driving device is provided in a mobile robot, a configuration in which a speed sensor is provided like the motor driving device 2 according to this embodiment can be suitably employed.

According to the above-mentioned embodiment, it is possible to provide a motor driving device that can detect an abnormality of an inverter with high accuracy.

Third Embodiment

Figure 7:
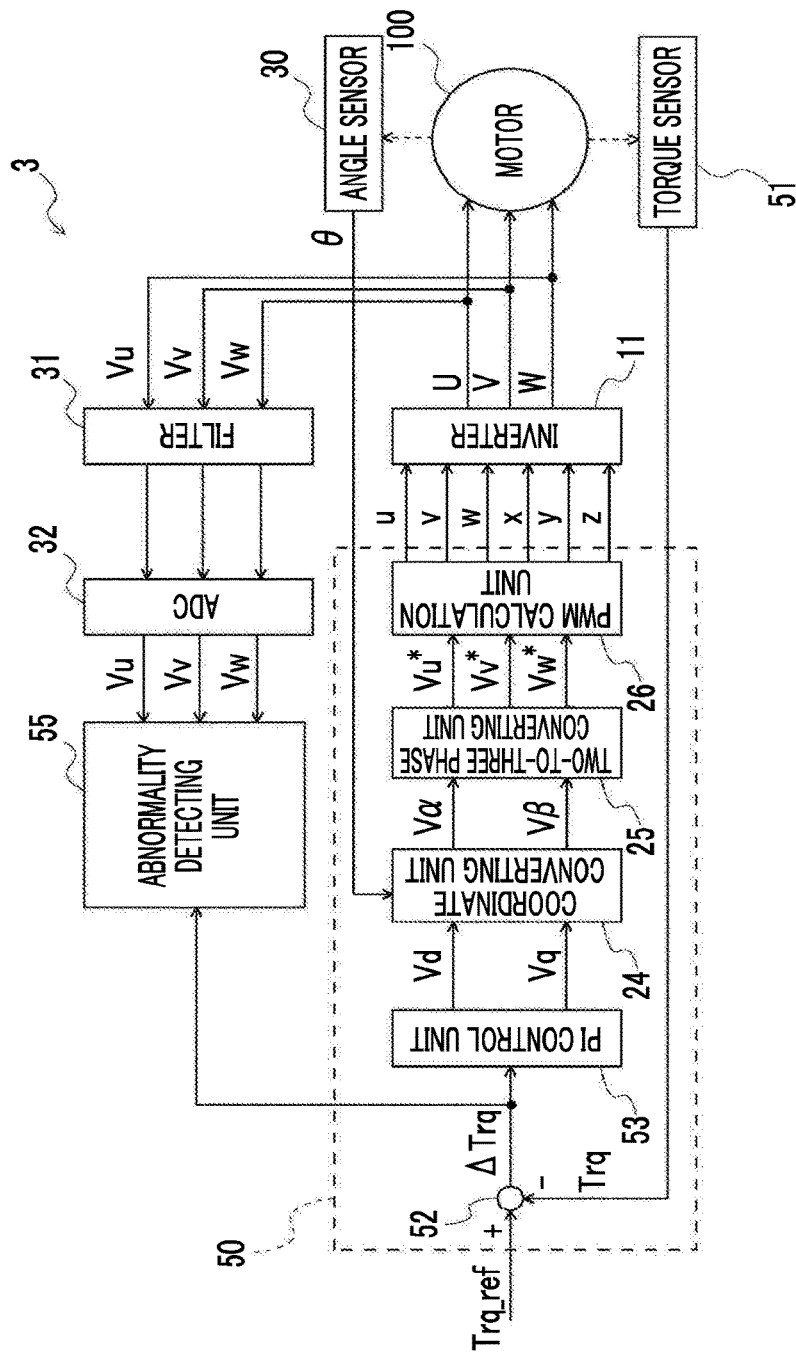
FIG. 7 is a block diagram illustrating a motor driving device according to a third embodiment.

A third embodiment of the disclosure will be described below. FIG. 7 is a block diagram illustrating a motor driving device according to the third embodiment. The motor driving device 3 according to this embodiment is different from the motor driving device 1 according to the first embodiment, in that a torque value Trq of the motor is detected using a torque sensor 51 and the motor 100 is feedback-controlled using the detected torque value Trq of the motor. The other configurations are the same as the motor driving device 1 described in the first embodiment (see FIGS. 1 to 4) and thus the same elements will be referenced by the same reference signs and description thereof will not be appropriately omitted.

As illustrated in FIG. 7, the motor driving device 3 according to this embodiment includes an inverter 11, a torque sensor 51, a subtractor 52, a PI control unit 53, a coordinate converting unit 24, a two-to-three phase converting unit 25, a PWM calculation unit 26, an angle sensor 30, a filter 31, an AD converter 32, and an abnormality detecting unit 55.

Here, the subtractor 52, the PI control unit 53, the coordinate converting unit 24, the two-to-three phase converting unit 25, and the PWM calculation unit 26 constitute an inverter control unit 50. The inverter control unit 50 generates control signals u, v, w, x, y, and z for feedback-controlling the motor 100 using a difference ΔTrq between a torque value Trq of the motor 100 detected by the torque sensor 51 and a control command value Trq_ref of the torque value Trq of the motor 100.

The torque sensor 51 detects the torque value Trq of the motor 100. The torque value Trq of the motor 100 detected by the torque sensor 51 is supplied to the subtractor 52. The subtractor 52 calculates the difference ΔTrq (=Trq_ref−Trq) between the control command value Trq_ref of the torque value Trq of the motor 100 and the torque value Trq supplied from the torque sensor 51 and supplies the difference ΔTrq to the PI control unit 53 and the abnormality detecting unit 55.

The PI control unit 53 generates control voltage values Vd and Vq such that the difference ΔTrq supplied from the subtractor 52 is zero, and supplies the generated control voltage values Vd and Vq to the coordinate converting unit 24. At this time, the PI control unit 53 generates the control voltage values Vd and Vq using P control (proportional control) and I control (integral control).

The coordinate converting unit 24 performs inverse Park conversion on the control voltage values Vd and Vq supplied from the PI control unit 23 to convert the control voltage values Vd and Vq in the rotational coordinate system into control voltage values Vα and Vβ in the fixed coordinate system. The two-to-three phase converting unit 25 performs inverse Clarke conversion on the two-phase control voltage values Vα and Vβ supplied from the coordinate converting unit 24 to convert the two-phase control voltage values Vα and Vβ into three-phase control voltage values Vu*, Vv*, and Vw*. The PWM calculation unit 26 generates pulse-shaped control signals u, v, w, x, y, and z for controlling the inverter 11 based on the three-phase control voltage values Vu*, Vv*, and Vw* supplied from the two-to-three phase converting unit 25. The inverter 11 generates driving power U, V, and W based on the control signals u, v, w, x, y, and z supplied from the PWM calculation unit 26 and supplies the generated driving power to the motor 100.

In this way, the motor driving device 3 according to this embodiment feedback-controls the motor 100 using the torque value Trq of the motor 100 detected by the torque sensor 51 as a feedback value. The configurations and operations of the inverter 11, the coordinate converting unit 24, the two-to-three phase converting unit 25, and the PWM calculation unit 26 illustrated in FIG. 7 are the same as described in the first embodiment and thus detailed description thereof will not be repeated.

The motor driving device 3 according to this embodiment detects an abnormality of the inverter 11 using the abnormality detecting unit 55. The abnormality detecting unit 55 is supplied with information on the voltage values Vu, Vv, and Vw of the driving power U, V, and W supplied to the motor 100. The voltage values Vu, Vv, and Vw of the driving power U, V, and W are subjected to removal of noise in the filter 31, are converted into digital signals by the AD converter 32, and then are supplied to the abnormality detecting unit 55. The abnormality detecting unit 55 is supplied with the difference ΔTrq between the control command value Trq_ref and the torque value Trq from the subtractor 52.

In the motor driving device according to this embodiment, the abnormality detecting unit 55 determines that the inverter 11 is abnormal when a sum of the voltage values Vu, Vv, and Vw of the driving power U, V, and W supplied to the motor 100 is equal to or greater than a predetermined voltage value and the difference ΔTrq between the control command value Trq_ref supplied to the inverter control unit 50 and the torque value Trq which is the feedback value is less than a predetermined value. The abnormality detecting unit 55 determines that the inverter 11 malfunctions when an abnormality of the inverter 11 is detected a predetermined number of times. An abnormality detecting operation of the motor driving device 1 according to this embodiment will be described below in detail.

Figure 8:
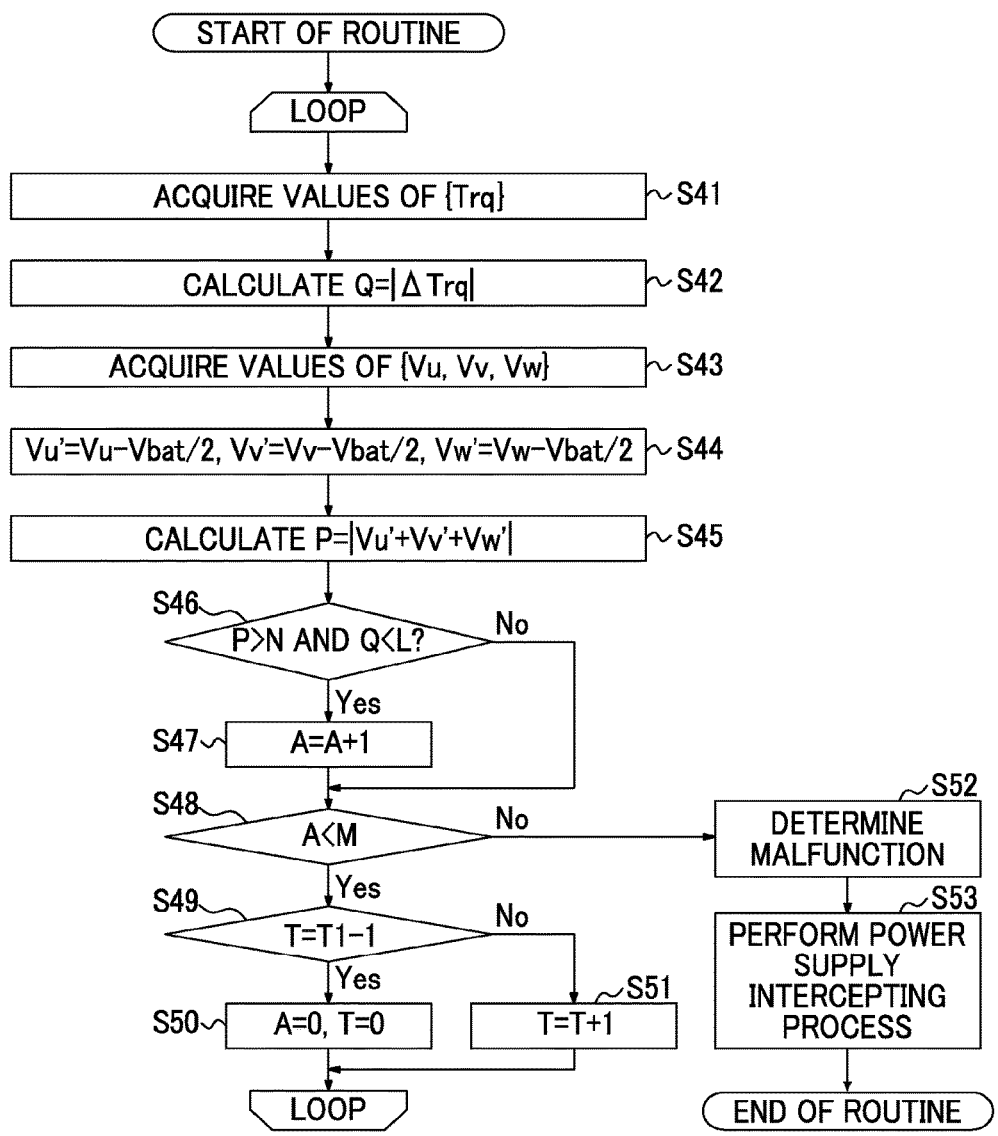
FIG. 8 is a flowchart illustrating an abnormality detecting operation of the motor driving device according to the third embodiment.

FIG. 8 is a flowchart illustrating the abnormality detecting operation of the motor driving device 2 according to this embodiment. An operation of the abnormality detecting unit 55 detecting that the inverter 11 is abnormal when the motor driving device 3 feedback-controls the motor 100 will be described below.

First, the subtractor 52 of the inverter control unit 50 illustrated in FIG. 7 acquires the torque value Trq of the motor from the torque sensor 51 (Step S41). Then, the subtractor 52 calculates a difference ΔTrq (=Trq_ref−Trq) between the control command value Trq_ref of the torque value Trq of the motor 100 and the acquired rotational speed Trq and supplies the calculated difference ΔTrq to the abnormality detecting unit 55.

The abnormality detecting unit 55 calculates Q=|ΔTrq| using the difference ΔTrq acquired from the subtractor 52

(Step S42). Here, the value of Q is a parameter corresponding to the difference between the control command value and the feedback value and means that the larger the value of Q becomes, the larger the difference between the control command value and the feedback value becomes.

Then, the abnormality detecting unit 55 acquires the voltage values Vu, Vv, and Vw of the driving power U, V, and W output from the inverter 11 (Step S43). Specifically, the voltage values Vu, Vv, and Vw of the driving power U, V, and W output from the inverter 11 are subjected to removal of noise in the filter 31, are converted into digital signals by the AD converter 32, and then are supplied to the abnormality detecting unit 55. For example, the filter 31 can be constituted by a low-pass filter. The filter 31 may be constituted by hardware or may be constituted by software.

Then, the abnormality detecting unit 55 calculates voltage values Vu', Vv', and Vw' using Expressions 1 to 3 which have been described above in the first embodiment (Step S44). Thereafter, the abnormality detecting unit 55 calculates P=|Vu'+Vv'+Vw'| (Step S45). The value of P corresponds to a sum of the voltage values of the driving power U, V, and W and is theoretically a constant value. Steps S44 and S45 illustrated in FIG. 8 are the same as Steps S5 and S6 in FIG. 3.

Then, the abnormality detecting unit 55 determines whether the inverter 11 is abnormal using the sum of three-phase voltage values P and the control difference Q which have been calculated as described above (Steps S46 to S53). The operations of Steps S46 to S53 illustrated in FIG. 8 are the same as the operations of Steps S7 to S14 in FIG. 3 which have been described above in the first embodiment and thus description thereof will not be repeated.

In this way, in the motor driving device 3 according to this embodiment, it is determined whether the inverter 11 is abnormal using the difference ΔTrq between the control command value and the feedback value in addition to the sum P of the three-phase AC voltage values Vu, Vv, and Vw of the driving power U, V, and W. That is, when the motor 100 is driven using the inverter 11, the sum of three-phase AC voltage values P (=|Vu'+Vv'+Vw'|) increases at a time at which the difference ΔTrq between the control command value Trq_ref and the feedback value Trq increases (in other words, a change of a control value of the motor increases).

In this embodiment, focusing on that characteristic, it is determined that the inverter 11 is not abnormal when the sum of the three-phase AC voltage values P of the driving power is large and the difference ΔTrq between the control command value Trq_ref and the feedback value Trq is large. Accordingly, it is possible to prevent erroneous detection of an abnormality of the inverter and to accurately detect an abnormality of the inverter.

As described above, in the motor driving device 3 according to this embodiment, the motor is feedback-controlled using the torque value detected by the torque sensor 51. For example, a system of a robot often employs a configuration in which a torque sensor is disposed in a motor. Accordingly, in this embodiment, even when a current sensor is not particularly provided unlike the motor driving device 1 according to the first embodiment, there is an advantage that the motor driving device according to this embodiment can be configured using an existing robot system.

In a robot requiring fine control such as a humanoid, speed control is essential, but, for example, when a current sensor is provided like the motor driving device 1 according to the first embodiment, a response may be delayed. Accordingly, when the motor driving device is provided in a humanoid, a configuration in which a torque sensor is provided like the motor driving device 3 according to this embodiment can be suitably employed.

According to the above-mentioned embodiment, it is possible to provide a motor driving device that can detect an abnormality of an inverter with high accuracy.

In the motor driving device according to the disclosure, the above-mentioned configurations of the first to third embodiments may be appropriately combined. That is, two or more of the current value of the driving power supplied to the motor, the rotational speed of the motor, and the torque value of the motor may be combined as a feedback value which is used to feedback-control the motor. The abnormality detecting unit may determine whether the difference between the control command value and the feedback value is less than a predetermined value by combining two or more of such feedback values.

While the disclosure has been described above with reference to the above-mentioned embodiments, the disclosure is not limited to the embodiments and includes various modifications, corrections, and combinations which can be made by those skilled in the art within the scope of the disclosure described in the appended claims.

What is claimed is:

1. A motor driving device that drives a motor which is driven with a three-phase alternating current, the motor driving device comprising:
   an inverter control unit configured to generate and output a control signal for feedback-controlling the motor using a control command value for setting driving of the motor and a feedback value including at least one of a current value of driving power supplied to the motor, a rotational speed of the motor, and a torque value of the motor;
   an inverter configured to supply the driving power to the motor in accordance with the control signal output from the inverter control unit; and
   an abnormality detecting unit configured to detect an abnormality of the inverter,
   wherein the abnormality detecting unit is configured to determine that the inverter is abnormal when a sum of three-phase AC voltage values of the driving power supplied to the motor is greater than a predetermined voltage value and a difference between the control command value supplied to the inverter control unit and the feedback value is less than a predetermined value.

2. The motor driving device according to claim 1, wherein the abnormality detecting unit is configured to determine that the inverter malfunctions when the abnormality of the inverter is detected a predetermined number of times.

3. The motor driving device according to claim 1, further comprising a current sensor configured to detect three-phase AC current values of the driving power supplied to the motor, wherein:
   the inverter control unit is configured to generate a first current value and a second current value of two phases which are the feedback value on the basis of the three-phase AC current values detected by the current sensor;
   the inverter control unit is configured to generate a control signal for feedback-controlling the motor using differences between the first current value and the second current value and a control command value of the first current value and a control command value of the second current value; and
   the abnormality detecting unit is configured to determine whether a difference between the control command value supplied to the inverter control unit and the feedback value is less than a predetermined value using at least one of a difference between the control command value of the first current value and the first current value, a difference between the control command value of the second current value and the second current value, and a sum of the difference between the control command value of the first current value and the first current value and the difference between the control command value of the second current value and the second current value.

4. The motor driving device according to claim 1, further comprising a speed sensor configured to detect the rotational speed of the motor, wherein:
   the inverter control unit is configured to generate a control signal for feedback-controlling the motor using a difference between the rotational speed of the motor detected by the speed sensor and a control command value of the rotational speed of the motor; and
   the abnormality detecting unit is configured to determine whether a difference between the control command value supplied to the inverter control unit and the feedback value is less than a predetermined value using a difference between the control command value of the rotational speed of the motor and the rotational speed of the motor.

5. The motor driving device according to claim 1, further comprising a torque sensor configured to detect a torque of the motor, wherein:
   the inverter control unit is configured to generate a control signal for feedback-controlling the motor using a difference between the torque value of the motor detected by the torque sensor and a control command value of the torque value of the motor; and
   the abnormality detecting unit is configured to determine whether a difference between the control command value supplied to the inverter control unit and the feedback value is less than a predetermined value using a difference between the control command value of the torque value of the motor and the torque value of the motor.

* * * * *